US 6,708,371 B2

(12) United States Patent
Belchine, III

(10) Patent No.: US 6,708,371 B2
(45) Date of Patent: Mar. 23, 2004

(54) POSITIVE RETAINING PIVOT PIN

(75) Inventor: Walter Belchine, III, Plainfield, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/166,858

(22) Filed: Jun. 11, 2002

(65) Prior Publication Data

US 2003/0226240 A1 Dec. 11, 2003

(51) Int. Cl.[7] ................................................ E05D 5/12
(52) U.S. Cl. ............................ 16/386; 16/342; 16/438
(58) Field of Search .......................... 16/386, 438, 342, 16/439, 436

(56) References Cited

U.S. PATENT DOCUMENTS

| 3,068,508 A | * | 12/1962 | Heyer | 16/386 |
| 4,675,940 A | * | 6/1987 | Brockhaus | 16/381 |
| 5,519,917 A | * | 5/1996 | Cordonnier | 16/422 |
| 5,765,263 A | * | 6/1998 | Bolinas et al. | 16/342 |
| 5,920,957 A | * | 7/1999 | Wagner | 16/438 |
| 6,076,233 A | * | 6/2000 | Sasaki et al. | 16/438 |
| 6,163,929 A | * | 12/2000 | Bradley | 16/380 |
| 6,223,395 B1 | * | 5/2001 | Miho et al. | 16/429 |
| 6,467,130 B2 | * | 10/2002 | Kurachi et al. | 16/438 |
| 6,511,036 B1 | * | 1/2003 | Hansen | 16/438 |
| 2003/0074767 A1 | * | 4/2003 | Chang | 16/438 |

FOREIGN PATENT DOCUMENTS

JP    05059864 A   *  3/1993   ............. E05D/5/12

* cited by examiner

*Primary Examiner*—Anthony Knight
*Assistant Examiner*—Christopher Boswell
(74) *Attorney, Agent, or Firm*—Mark W. Croll; Paul F. Donovan

(57) ABSTRACT

A passenger assist handle assembly for an automobile includes a handle with mounting structures pivotally connected to mounting blocks secured to the automobile. The pivotal connection is made by way of pins disposed in apertures of the mounting structures and mounting blocks. The pins include heads having protrusions thereon received in slots for securing the pins in position. The shapes and locations of the slots and protrusions simplify manufacture and facilitate installation.

20 Claims, 2 Drawing Sheets

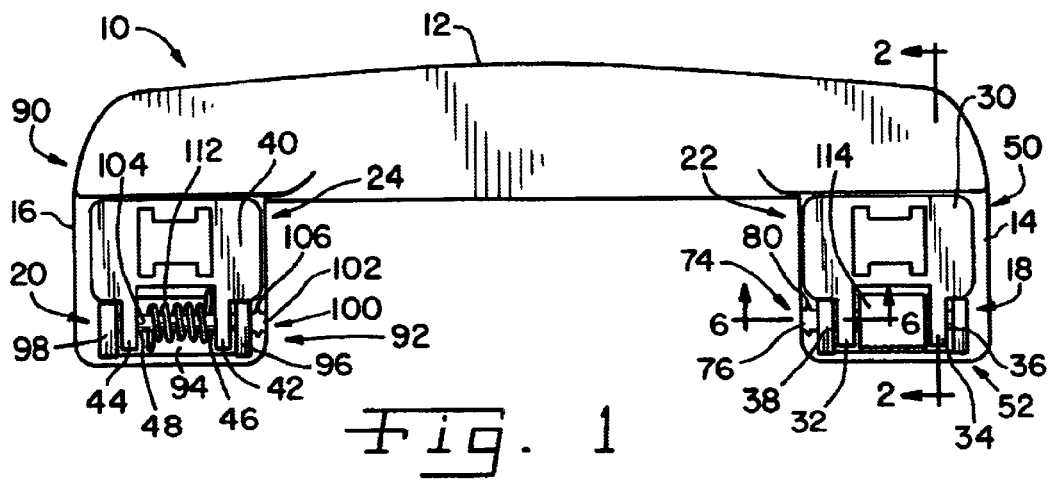
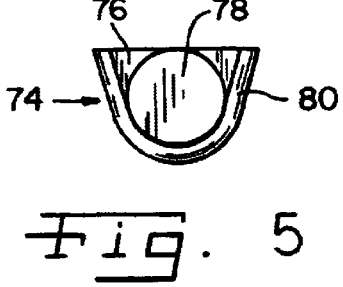
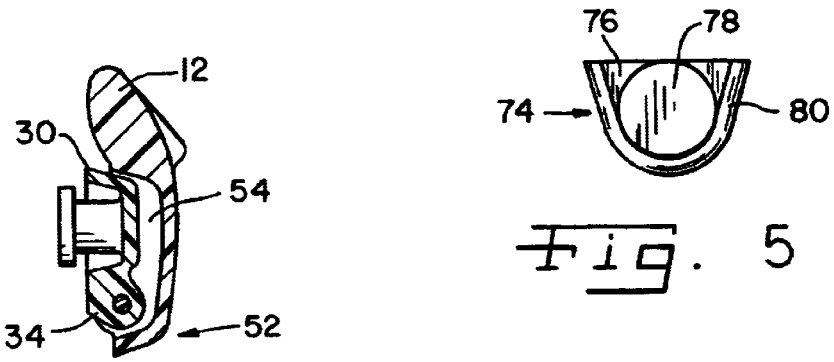
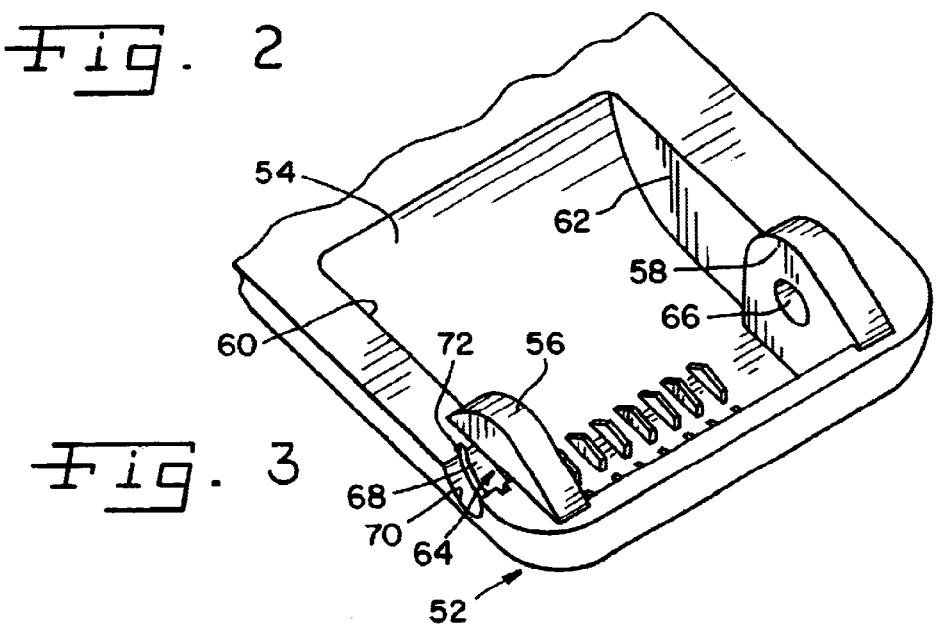

POSITIVE RETAINING PIVOT PIN

FIELD OF THE INVENTION

The present invention relates to hinge-type mounting structures, and more particularly to hinge-type mounting structures useful for passenger assist handles in motor vehicles or the like. Specifically, the invention pertains to structure associated with the hinge pin, and means for locking the hinge pin in position.

BACKGROUND OF THE INVENTION

Automobiles are commonly provided with passenger assist handles that may take the form of loops or bars that can be grasped by a passenger, to assist the passenger in getting into or out of the automobile. The passenger assist handles can also be used for stabilizing the passenger during operation of the motor vehicle, or for moving about the automobile.

In a known design for such passenger assist handles, the handle comprises a substantially rigid bar having legs at the ends thereof, with the legs being pivotally connected to mounting blocks attached to the frame, door posts or other interior structures of the vehicle. The handle can be free swinging from the mounting blocks or, more commonly, provided with a spring urging the handle toward a closed, non-use position.

Hinged passenger assist handles of this type are commonly made of plastic, and are secured to the mounting blocks by plastic hinge pins inserted through associated mating hinge components on the handle and the mounting block. Commonly, the pin is secured in place only by the interference fit between apertures in the hinge components and the surface of the pin. Securing by interference fit can be a source of problems. If the hinge pin is too loosely fitting, the pin can become dislodged through normal use of the handle, or during operation of the vehicle in which the handle is installed. If the hinge pin is fit too snuggly, the pin can be difficult to insert, thereby complicating installation and assembly of the assist handle structure. Clearly, advantages can be obtained from simplifying the balance needed between the requirement for adequate retention of the pin after insertion, and the desire for easier pin insertion during assembly.

Several passenger assist handles often are provided in each automobile. Thus, any reductions in manufacturing expense, and simplification in manufacturing procedures can result in significant overall cost savings. However, because of the design of known passenger assist handle assemblies, the molds required during manufacture have been somewhat complicated and expensive. Often, hydraulically actuated core components are needed. The molds are expensive to design, manufacture and maintain or service. Cycle times in using the mold are slowed as a result of the adjustments needed to the mold structure during the molding process. Simplifying the mold and decreasing mold use cycle times could reduce costs for the parts significantly.

What is needed in the art is a passenger assist handle assembly that is easy to manufacture, easy to install and positively and securely retained in the installed position.

SUMMARY OF THE INVENTION

The present invention provides a hinge structure in which a hinge pin is inserted through apertures of a mounting structure and a mounting block, with one of the mounting structure or mounting block having a slot, and the pivot pin having a head with a protrusion thereon received in the slot. As a result of the open configuration the parts are easy to manufacture, and the pin is easy to install.

In one aspect thereof, the invention provides a hinge with a base having a mount including a base aperture therethrough. A pivot structure is provided for movement relative to the base. The pivot structure includes an aperture therethrough. A pin extends through the apertures, and includes a head with a protrusion. A slot in the base or the pivot structure receives the protrusion and locks the pin in position.

In another aspect thereof, the invention provides a passenger assist handle for an automobile with a base including an upstanding mounting block having an aperture therethrough. A handle includes a mounting structure having a tab with an aperture therethrough and a slot in the handle adjacent the tab. A pin including a head extends through the apertures and has a protrusion received in the slot for securing the pin.

In a further aspect thereof, the invention provides a passenger assist handle assembly for an automobile with first and second mounting blocks each including a base and a pair of upstanding mounting elements having apertures. A handle is provided and includes first and second mounting structures each having a pair of upstanding mounting tabs with apertures therein. A trough in each mounting structure has an open top along the length thereof. Each trough has a slot therein. One mounting structure is associated with each mounting block. First and second pins each include a head having a protrusion. One pin is disposed in the apertures of each mounting block and the mounting structure associated therewith, with the heads of the pins disposed in the troughs and the protrusions received in the slots for securing positions of the pins.

An advantage of the present invention is providing a passenger assist handle having a hinge structure with a hinge pin that is easy to insert and positively and securely retained in the installed position.

Another advantage of the present invention is providing a passenger assist handle including a retaining groove that can be molded without the need for moving slides in the mold, thereby simplifying the mold structure and the molding process for making the handle.

A further advantage of the present invention is providing a hinge pin for a passenger assist handle that can be molded without moving slides and with a simplified tooling construction and molding process.

A still further advantage of the present invention is providing a passenger assist handle that can be manufactured less expensively than more complicated passenger assist handle designs.

Yet another advantage of the present invention is providing a passenger assist handle structure that can be manufactured with simple mold construction, thereby resulting in faster mold processing times, lower mold construction costs, lower mold maintenance costs and lower overall part costs.

Other features and advantages of the invention will become apparent to those skilled in the art upon review of the following detailed description, claims and drawings in which like numerals are used to designate like features.

BRIEF DESCRIPTION OF THE DRAWINGS

FIG. 1 is a plan view of a passenger assist handle structure according to the present invention;

FIG. 2 is a cross-sectional view of the passenger assist handle structure shown in FIG. 1, taken along line 2—2 of FIG. 1;

FIG. 3 is a perspective view of one of the handle mounting structures shown in FIG. 1;

FIG. 5 is an end view of the hinge pin shown in FIG. 4 taken in the direction of line 5—5 of FIG. 4.

Figure 4:
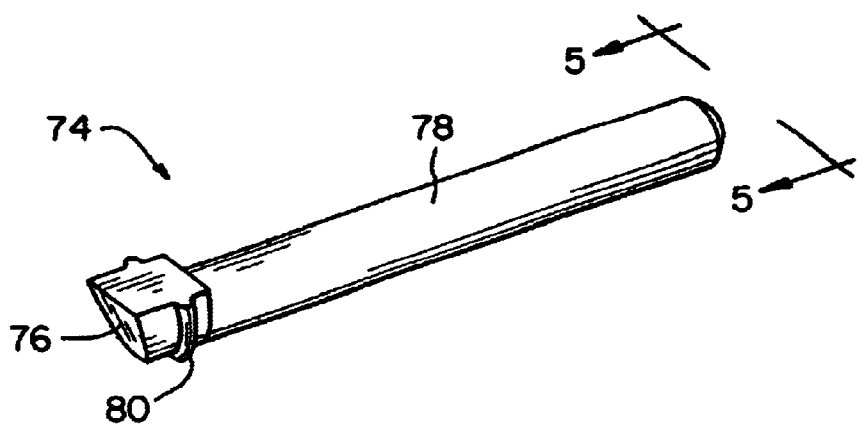
FIG. 4 is a perspective view of one of the hinge pins shown in FIG. 1.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof.

DETAILED DESCRIPTION OF THE PREFERRED EMBODIMENT

Referring now more specifically to the drawings, and to FIG. 1 in particular, numeral 10 designates a passenger assist handle assembly which utilizes the positive hinge pin retaining features of the present invention. Passenger assist handle assembly 10 includes a grab handle 12 with legs 14 and 16 on the opposite ends thereof having mounting structures 18 and 20, respectively. Each mounting structure 18 and 20 is cooperatively associated with a mounting block 22, 24 secured to the vehicle interior, such as to a frame component, door post or the like (not shown).

Mounting block 22 includes a base 30 and upstanding mounting elements 32 and 34. Each mounting element 32, 34 includes an aperture 36, 38, respectively. Mounting block 24 includes a base 40 and upstanding mounting elements 42 and 44. Each mounting element 42, 44 is provided with an aperture 46, 48 therein, respectively.

Each base 30, 40 is securely attached to the vehicle interior (not shown), such as a door post or the like (not shown). The manner in which bases 30 and 40 are securely attached to the vehicle is well known to those familiar with the art, and will not be described in further detail herein.

Grab handle 12 is pivotally connected to mounting blocks 22 and 24 through pivotal mounting structures 18 and 20. Thus, handle 12 can be moved relative to mounting blocks 22 and 24 between a closed, nonuse position, and an open position in which a person can firmly grasp handle 12.

Leg 14 has a proximal end 50 and a distal end 52. Proximal end 50 is connected to grab handle 12, which may be via integral casting with grab handle 12. Mounting structure 18 is provided at distal end 52, and includes a cavity 54 (FIG. 3) having upstanding mounting tabs 56 and 58 near side walls 60 and 62 of cavity 54. Mounting tabs 56 and 58 include apertures 64 and 66, respectively. Leg 14 includes a trough 68 adjacent one mounting tab 56, 58, and as shown includes trough 68 adjacent mounting tab 56. Trough 68 is in substantial alignment with aperture 64, and has a semicircular bottom 70 extending from an outer edge 69 of leg 14 to mounting tab 56. A slot 72, in the form of a semicircular depression in bottom 70, is provided in trough 68. Slot 72 is transverse to the longitudinal axis of trough 68, and is substantially parallel to, and minimally spaced from mounting tab 56.

Mounting structure 18 is operatively associated with mounting block 22 such that mounting tabs 56 and 58 are located adjacent to, and immediately outside of mounting elements 32 and 34, respectively. A hinge pin 74 is provided to secure mounting structure 18 to mounting block 22. Hinge pin 74 includes a head 76 and a shank 78. Shank 78 is of sufficient length to extend through aperture 64 of mounting tab 56, aperture 36 of mounting element 32, aperture 38 of mounting element 34 and aperture 66 of mounting tab 58. It should be understood that the furthest aperture from head 76, aperture 66 in mounting tab 58 as illustrated, need not be a "through aperture" but may instead comprise a depression or hole having a bottom such that the end of pin 74 is not exposed.

Head 76 includes a semicircular portion having a protrusion in the nature of a ridge 80 extending outwardly thereof. Ridge 80 is shaped and designed to be received in slot 72, to thereby retain pin 74 in its installed position.

Leg 16 similarly includes a proximal end 90 and a distal end 92 with the mounting structure 20 provided at distal end 92. A cavity 94 is similarly provided with mounting tabs 96 and 98 adjacent side walls (not visible) similar to side walls 60 and 62. Each mounting tab 96 and 98 includes apertures (not visible) similar to apertures 64 and 66 for receiving a hinge pin 100 having a head 102, a shank 104, with a ridge 106 on head 102. Mounting structure 20 and mounting block 24 are operatively associated such that mounting tabs 96 and 98 are positioned immediately outside of mounting elements 42 and 44, with the apertures therein in alignment such that shank 104 of pin 100 extends through the apertures of mounting elements 42 and 44 and mounting tabs 96 and 98. Again, the furthest aperture, that aperture in mounting tab 98 as shown in the drawings need not be a through aperture, but can instead have a bottom. Similarly to pin 74, pin 100 has a semicircular portion with ridge 106 thereof received in a slot 108 in a trough 110 of leg 16 similar to slot 72 provided in trough 68 of leg 14.

In assembly of passenger assist handle assembly 10, mounting structures 18 and 20 are aligned with mounting blocks 22 and 24, respectively, and pins 74 and 100 are inserted through mounting elements 32, 34, 42, 44 and mounting tabs 56, 58, 76 and 78. Because troughs 68 and 110 each have an open top, heads 76 and 102 can deflect slightly thereby making insertion of hinge pins 74 and 100 easier, requiring less force. Insertion of pins 74 and 100 continues until ridges 80 and 106 are received in slots 72 and 108. Once ridges 80 and 106 are thus received in slots 72 and 108, pins 74 and 100 are not easily dislodged. Thus, pins 74 and 100 are positively retained in their installed positions.

To urge handle 12 towards its closed position, a spring 112 can be provided in one or both cavities 54 and 74, with spring 112 surrounding one of pins 74 and 100. A cover 114 (only one shown) can be provided for cavities 54 and 74, over spring or springs 112.

Figure 6:
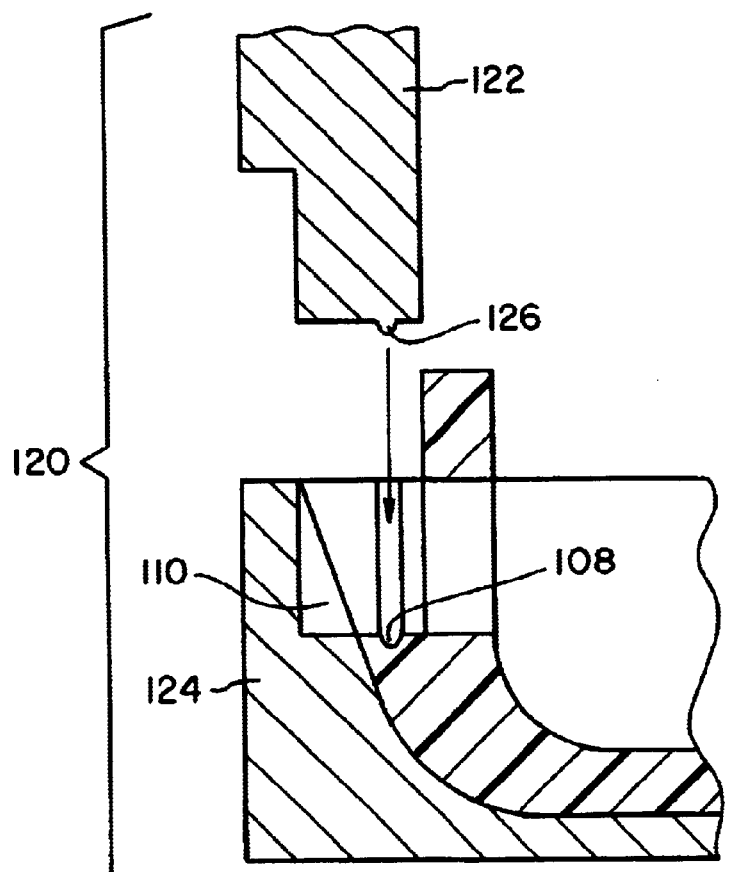
FIG. 6 is an enlarged cross-sectional view through an exemplary mold structure useful in molding a handle of the present invention, illustrating the manner in which the mold structure is simplified.

FIG. 6 illustrates the manner in which a grab handle 12 of the present invention can be manufactured. A mold 120 includes a bottom mold portion 122 and a top mold portion 124. Slot 92 is formed from a rib 126 provided in top mold portion 124. Slot 72 can be similarly formed on the opposite end of handle 12.

As shown in FIG. 4, pins 74 and 100 can similarly be manufactured from simple mold structures not requiring hydraulic cores. Slots 72 and 92 are formed in the dye draw direction such that no other additional moving pieces are required in a mold for handle 12. Similarly, pins 74 and 100 are manufactured with simple mold designs. Thus, simpler mold constructions are possible and faster process cycle times in molding handle 12 and pins 74 and 100 are possible. With the simplified mold constructions, lower mold construction costs are achieved and with the elimination of hydraulic mold interior components, lower mold maintenance costs can be realized. As a result of the lower cost setup expense, lower maintenance costs and faster processing cycle times lower overall part cost is achieved with the present invention.

The present invention provides a hinged passenger assist handle simpler in manufacture and less expensive than previous designs. The hinge pins associated therewith can be inserted with less insertion force but upon full insertion are positively retained in proper position. Thus, a less expensive part easier to install with greater security in installation is achieved.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A hinge comprising:
    a base having a mount aperture therethrough;
    a pivot structure for movement relative to said base, said pivot structure including a mounting member having an aperture therethrough;
    a pin extending through said apertures, said pin including a head having a protrusion, and a cylindrical shank extending from said head;
    a receiving area provided in one of said base and said pivot structure, said receiving area being aligned with the associated aperture in said mount of said base or said mounting member in said pivot structure; and
    a slot provided in said receiving area and being located adjacent the associated mount of said base or said mounting member of said pivot structure, said slot being adapted for receiving said protrusion and locking said pin in position.

2. The hinge of claim 1, said pivot structure including an upstanding mounting tab, said aperture in said pivot structure extending through said mounting tab, and said slot located adjacent said mounting tab.

3. The hinge of claim 2, said pivot structure including a trough aligned with said aperture in said mounting tab, and said slot being disposed in said trough.

4. The hinge of claim 3, said trough having a curved bottom, said slot being disposed in said curved bottom, and said head of said pin having a curved portion received in said trough.

5. The hinge of claim 4, said protrusion comprising a ridge on said curved portion of said head.

6. The hinge of claim 5, said pivot structure including two upstanding mounting tabs, each said mounting tab having an aperture therein for receiving said pin.

7. The hinge of claim 1, said pivot structure including two upstanding mounting tabs, each said mounting tab having an aperture therein for receiving said pin.

8. The hinge of claim 7, said pivot structure including a handle.

9. A passenger assist handle assembly for an automobile, comprising:
    a mounting block including a base and an upstanding mounting element having an aperture therein;
    a handle including a mounting structure having an upstanding mounting tab with an aperture therethrough, a trough adjacent said mounting tab and a slot disposed in said trough; and
    a pin including a head, said pin disposed in said apertures, and said head having a protrusion received in said slot for securing a position of said pin.

10. The passenger assist handle assembly of claim 9, said mounting block including two upstanding mounting elements each having an aperture therein, and said pin disposed in each said aperture.

11. The passenger assist handle of assembly claim 10, said mounting structure including two said mounting tabs, each having an aperture therethrough, and said pin disposed in each said aperture.

12. The passenger assist handle of assembly claim 9, including two said mounting blocks, each including a base and an upstanding mounting element having an aperture therein, said handle including two said mounting structures, each having an upstanding mounting tab with an aperture therethrough, a first slot adjacent one said tab and a second slot adjacent the other said tab; one said mounting structure associated with each said mounting element; and first and second pins, one said pin disposed in said aperture of one said mounting element and the mounting structure associated therewith and the other said pin disposed in the apertures of the other said mounting element and the mounting structure associated therewith, each said pin including a head having a protrusion received in a said slot.

13. The passenger assist handle assembly of claim 12, each said mounting structure including a trough, one said trough adjacent each said mounting tab, and one said slot provided in each said trough.

14. The passenger assist handle assembly of claim 13, each said trough having a semicircular round bottom and an open top, and each said slot being a semicircular depression in one said trough.

15. The passenger assist handle assembly of claim 14, each said pin having a semicircular head portion, and each said protrusion being a ridge on a said semicircular portion.

16. The passenger assist handle assembly of claim 9, said slot having a semicircular bottom and an open top.

17. The passenger assist handle assembly of claim 16, said head of said pin including a semicircular portion received in said trough.

18. The passenger assist handle assembly of claim 9 made of plastic.

19. A passenger assist handle assembly for an automobile, comprising:
    first and second mounting blocks each including a base and a pair of upstanding mounting elements having apertures;

a handle including first and second mounting structures each having a pair of upstanding mounting tabs with apertures therein, and a trough in each said mounting structure, each said trough having an open top along the length thereof, each said trough having a slot therein, one said mounting structure associated with each said mounting block; and first and second pins each including a head having a protrusion, one said pin disposed in said apertures of each said mounting block and the mounting structure associated therewith, with said heads of said pins disposed in said troughs and said protrusions received in said slots for securing positions of said pins.

20. The passenger assist handle assembly of claim 19 made of plastic.

* * * * *